(12) United States Patent
Osada (10) Patent No.: US 11,168,594 B2
(45) Date of Patent: Nov. 9, 2021

(54) BLOW-BY GAS SYSTEM (71) Applicant: ISUZU MOTORS LIMITED, Tokyo (JP)

(72) Inventor: Hideki Osada, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/972,529

(22) PCT Filed: Jun. 3, 2019

(86) PCT No.: PCT/JP2019/021971
§ 371 (c)(1),
(2) Date: Dec. 4, 2020

(87) PCT Pub. No.: WO2019/235419
PCT Pub. Date: Dec. 12, 2019

(65) Prior Publication Data
US 2021/0270157 A1  Sep. 2, 2021

(30) Foreign Application Priority Data
Jun. 4, 2018 (JP) .............................. JP2018-107087

(51) Int. Cl.
*F01M 13/02* (2006.01)
*F02M 25/06* (2016.01)
*F01M 13/04* (2006.01)

(52) U.S. Cl.
CPC .......... *F01M 13/021* (2013.01); *F01M 13/04* (2013.01); *F02M 25/06* (2013.01);
(Continued)

(58) Field of Classification Search
CPC ................. F01M 13/021; F01M 13/04; F01M 2013/027; F01M 2013/0477; F01M 13/02; F01M 2013/026; F02M 25/06
See application file for complete search history.

(56) References Cited

U.S. PATENT DOCUMENTS

2013/0213369 A1*  8/2013  Doko ................... F01M 13/023
                                                            123/574
2018/0156168 A1    6/2018  Yaguchi et al.

FOREIGN PATENT DOCUMENTS

JP  2006316698 A  11/2006
JP  2016186311 A  10/2016
(Continued)

OTHER PUBLICATIONS

International Search Report and Written Opinion for related PCT App No. PCT/JP2019/021971 dated Aug. 20, 2019, 9 pgs. (partial translation).

*Primary Examiner* — Jacob M Amick
(74) *Attorney, Agent, or Firm* — Procopio, Cory, Hargreaves & Savitch LLP (57) ABSTRACT

This blow-by gas system is provided with: a blow-by gas flow path through which a blow-by gas discharged from an internal combustion engine passes; and an oil separator disposed midway along the blow-by gas flow path. A downstream end of the blow-by gas flow path connects to at least one of a predetermined portion of an intake passageway and a midway portion of an air introduction passageway. The predetermined portion is a portion at which at least some of the blow-by gas that has flowed into the intake passageway flows into the air introduction passageway together with an intake air in the intake passageway.

4 Claims, 5 Drawing Sheets

(52) U.S. Cl.
CPC . *F01M 2013/026* (2013.01); *F01M 2013/027* (2013.01); *F01M 2013/0477* (2013.01)

(56) References Cited

FOREIGN PATENT DOCUMENTS

| | | |
|---|---|---|
| JP | 2017020454 A | 1/2017 |
| JP | 2017031898 A | 2/2017 |

\* cited by examiner

BLOW-BY GAS SYSTEM

CROSS-REFERENCE TO RELATED APPLICATIONS

This application is a U.S. National Stage entry of PCT Application No: PCT/JP2019/021971 filed Jun. 3, 2019, which claims priority to Japanese Patent Application No. 2018-107087 filed Jun. 4, 2018, the contents of which are incorporated herein by reference.

TECHNICAL FIELD

The present disclosure relates to a blow-by gas system.

BACKGROUND ART

A blow-by gas system applied to a vehicle including an internal combustion engine, an intake passage, and a compressor included in a supercharger has been known. As such a blow-by gas system, one has been known including a blow-by gas flow path through which a blow-by gas discharged from an internal combustion engine is caused to pass through an oil separator removing oil from the blow-by gas, and thereafter return to an intake passage upstream with respect to a compressor included in a supercharger (see, for example, Patent Literature 1).

CITATION LIST

Patent Literature

Patent Literature 1: JP-A-2017-20454

SUMMARY OF INVENTION

Technical Problem

In the blow-by gas system as described above, the oil contained in the blow-by gas discharged from the internal combustion engine is removed by passing through the oil separator. However, there may be a case where the oil cannot be completely removed by the oil separator, and in this case, a small amount of oil is contained in the blow-by gas that has passed through the oil separator.

In the case where oil is contained in the blow-by gas that has passed through the oil separator as described, there is a possibility that "oil coking" in which oil in the blow-by gas introduced into the compressor included in the supercharger is coking (carbonized) in the compressor occurs when an operating state of the compressor included in the supercharger is a high supercharging operating state (for example, when an intake air temperature after supercharging is high or when a manifold air pressure after supercharging is high). When the amount of substances (oil coking substance) generated by the oil coking is large, the oil coking substances generated in this large amount can present intake resistance, and thus supercharging efficiency of the supercharger is reduced.

An object of the present disclosure is to provide a blow-by gas system capable of preventing a decrease in supercharging efficiency of a supercharger caused by an oil coking substance.

Solution to Problem

The blow-by gas system according to an aspect of the present invention is a blow-by gas system applied to a vehicle including: an internal combustion engine; an intake passage through which intake air to be sucked into the internal combustion engine passes; and a compressor included in a supercharger disposed in the intake passage. The vehicle includes: an air suction mechanism configured to suck air from an introduction port thereof and to discharge the sucked air from a discharge port thereof; and an air introduction passage communicating between a portion in the intake passage upstream with respect to the compressor and the introduction port of the air suction mechanism. The blow-by gas system includes: a blow-by gas flow path through which a blow-by gas discharged from the internal combustion engine passes; and an oil separator disposed at a midway portion in the blow-by gas flow path. A downstream end portion of the blow-by gas flow path in a blow-by gas flowing direction is connected to at least one of a predetermined portion in the intake passage and a midway portion in the air introduction passage, and the predetermined portion is a portion configured to allow at least a part of the blow-by gas flowing into the intake passage after passing through the blow-by gas flow path to flow into the air introduction passage together with the intake air passing through the intake passage.

Advantageous Effects of Invention

According to the blow-by gas system, it is possible to prevent a decrease in supercharging efficiency of a supercharger caused by an oil coking substance.

DESCRIPTION OF EMBODIMENTS

First Embodiment

Figure 1:
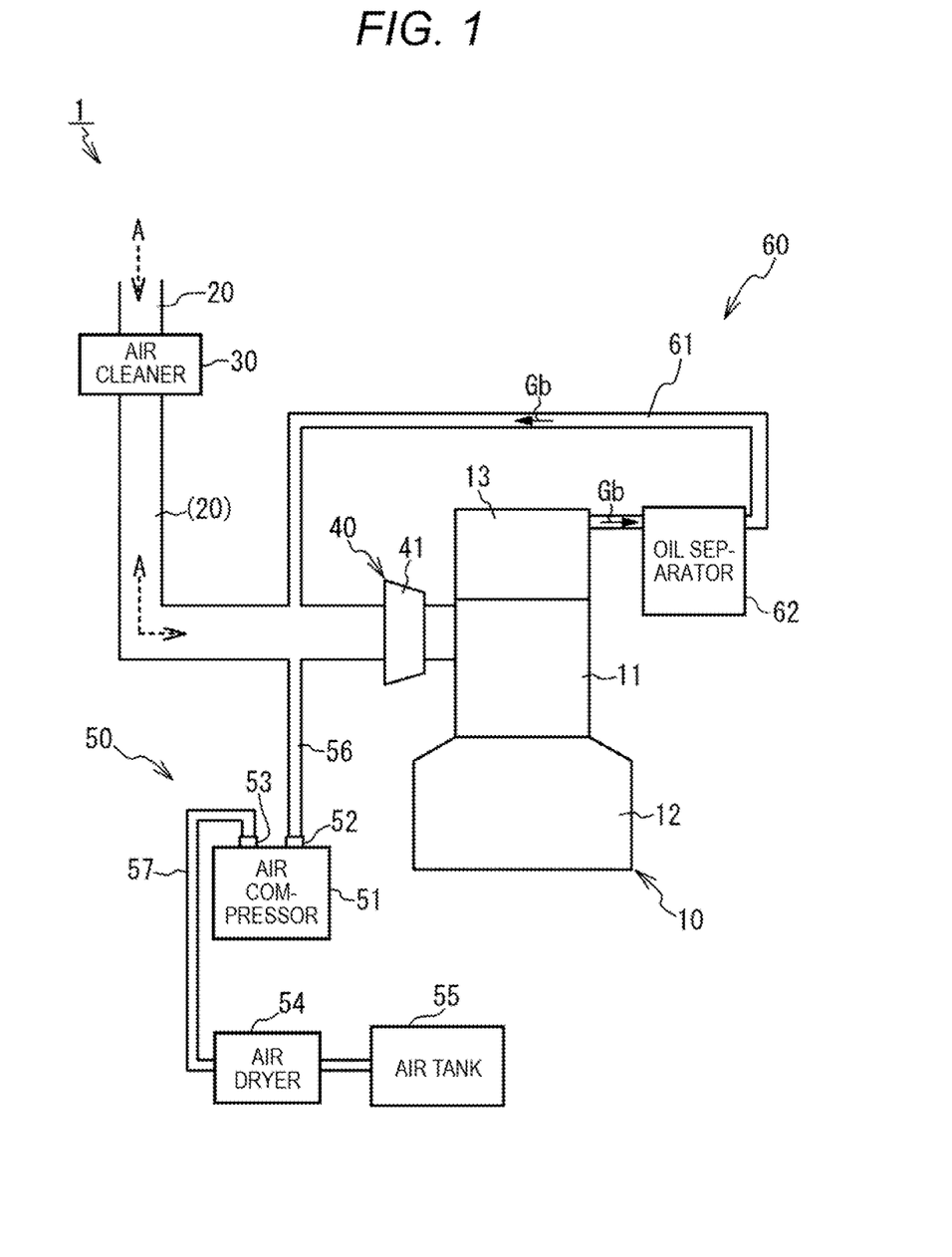
FIG. 1 is a schematic configuration diagram of a vehicle to which a blow-by gas system according to a first embodiment is applied.

Hereinafter, a blow-by gas system 60 according to a first embodiment will be described with reference to the drawings. FIG. 1 is a schematic configuration diagram of a vehicle 1 to which the blow-by gas system 60 according to the present embodiment is applied. The vehicle 1 includes an internal combustion engine 10, an intake passage 20, an air cleaner 30, a supercharger 40, an air compression system 50, and the blow-by gas system 60. A specific type of the vehicle 1 is not particularly limited, and various types of vehicles such as a commercial vehicle and a passenger car can be used. In the present embodiment, as an example of the vehicle 1, a commercial vehicle, specifically, a truck is used.

The internal combustion engine 10 includes an internal combustion engine body 11. The internal combustion engine body 11 includes a cylinder block having a cylinder formed therein, a cylinder head disposed at an upper portion of the cylinder block, a piston disposed in the cylinder, and a crankshaft connected to the piston via a connecting rod. Further, the internal combustion engine 10 includes a crankcase 12. The crankcase 12 is connected to a lower portion of the cylinder block. Inside the crankcase 12, the crankshaft is accommodated. Further, the internal combustion engine 10 includes a cylinder head cover 13. The cylinder head cover 13 is disposed at an upper portion of the cylinder head. Inside the cylinder head cover 13, a valve mechanism such as a cam is accommodated.

A specific type of the internal combustion engine 10 is not particularly limited, and various types of internal combustion engines such as a diesel engine and a gasoline engine can be used. In the present embodiment, a diesel engine is used as an example of the internal combustion engine 10.

The intake passage 20 is a passage through which intake air (A) to be sucked into the internal combustion engine 10 passes. A downstream end portion of the intake passage 20 is connected to an intake port of the internal combustion engine 10. Although not shown, the internal combustion engine 10 also includes an exhaust passage through which exhaust gas discharged from the internal combustion engine 10 passes. An upstream end portion of the exhaust passage is connected to an exhaust port of the internal combustion engine 10. The air cleaner 30 is disposed at a portion upstream with respect to the supercharger 40 in the intake passage 20. The intake air flowing into the intake passage 20 from an upstream end portion of the intake passage 20 is fresh air. The air cleaner 30 is a member having a function of removing foreign substances such as dust and dirt contained in the fresh air.

The supercharger 40 is a device that supercharges, by using the compressor 41, the intake air to be sucked into the internal combustion engine 10. A specific configuration of the supercharger 40 is not particularly limited as long as the supercharger 40 has such a function, and various types of superchargers can be used, such as a turbo supercharger driven by the compressor 41 using energy of exhaust gas, a mechanical supercharger driven by the compressor 41 using power of the internal combustion engine 10, or an electric supercharger driven by the compressor 41 using power of an electric motor. In the present embodiment, a turbo supercharger is used as an example of the supercharger 40. Specifically, the supercharger 40 according to the present embodiment includes a turbine (not shown) disposed in the exhaust passage, the compressor 41 disposed in the intake passage 20, and a rotary shaft (not shown) that couples the turbine with the compressor 41. When the turbine receives energy of the exhaust gas and is driven, the compressor 41 coupled with the turbine is driven via the rotary shaft to supercharge the intake air.

The air compression system 50 is a system that compresses air, and in the present embodiment, includes an air compressor 51, an air dryer 54, an air tank 55, an air introduction passage 56, and a discharge air passage 57.

The air compressor 51 is a device that sucks air from an introduction port 52, that compresses the sucked air, and that discharges the compressed air from a discharge port 53. The air compressor 51 is an example of an "air suction mechanism".

A drive source of the air compressor 51 is not particularly limited, and the air compressor 51 according to the present embodiment is driven by the internal combustion engine 10 as an example. Specifically, the air compressor 51 according to the present embodiment is coupled with a crankshaft of the internal combustion engine body 11 via a power transmission member (not shown). That is, the air compressor 51 according to the present embodiment is driven by power of the crankshaft. Therefore, the air compressor 51 starts operating (compression) at the same time as the start of the internal combustion engine 10.

The air introduction passage 56 is a passage communicating between a portion of the intake passage 20 upstream with respect to the compressor 41 of the supercharger 40 (in the present embodiment, a portion downstream with respect to the air cleaner 30) and the introduction port 52 of the air compressor S.

The discharge air passage 57 is a passage through which the discharge port 53 of the air compressor 51, the air dryer 54, and the air tank 55 communicate with each other. The air discharged from the air compressor 51 (air after compression) is introduced to the air dryer 54, and is stored in the air tank 55 after passing through the air dryer 54.

The air dryer 54 is disposed at a portion in the discharge air passage 57, between the discharge port 53 of the air compressor 51 and the air tank 55, and has a function of removing oil and moisture contained in the air introduced to the air dryer 54.

The air tank 55 is disposed at a portion downstream with respect to the air dryer 54 in the discharge air passage 57, and is a tank for storing the air introduced into the air tank 55. A use purpose of the air stored in the air tank 55 is not particularly limited, and the air can be used in various types of devices that can use compressed air, such as a brake system of the vehicle 1, an air suspension of the vehicle 1 or a horn (klaxon horn) of the vehicle 1.

Here, as an example, the air compression system 50 according to the present embodiment uses the air stored in the air tank 55 in all of the brake system (specifically, a brake booster), the air suspension, and the horn. More specifically, in this case, the brake booster, the air suspension, the horn, and the air tank are communicated with each other by a piping member. Accordingly, the air stored in the air tank is supplied to these devices via the piping member.

The blow-by gas system 60 according to the present embodiment is applied to the vehicle 1 as described above. Next, a configuration of the blow-by gas system 60 will be described. The blow-by gas system 60 includes a blow-by gas flow path 61 and an oil separator 62.

The blow-by gas flow path 61 is a flow path through which a blow-by gas (Gb) discharged from the internal combustion engine 10 passes. Specifically, in the blow-by gas flow path 61 according to the present embodiment, an upstream end portion in a flowing direction of the blow-by gas is connected to a blow-by gas discharge port provided on a lateral outer wall of the cylinder head cover 13 of the internal combustion engine 10. A downstream end portion of the blow-by gas flow path 61 in the blow-by gas flowing direction is connected to a predetermined portion of the intake passage 20. Details of the predetermined portion will be described later. The blow-by gas generated in the internal combustion engine 10 passes through an inside of the cylinder head cover 13 after leaking into the crankcase 12 from a gap between each cylinder and the piston inside the cylinder, and flows into the blow-by gas flow path 61.

The oil separator 62 is disposed at a midway portion in the blow-by gas flow path 61. The oil separator 62 has a function of removing oil contained in the blow-by gas flowing into the oil separator 62. As long as the oil separator 62 has such a function, a specific configuration of the oil separator 62 is not particularly limited, and a known oil separator (which may be referred to as an oil mist separator) can be used. Therefore, a detailed description of a structure of the oil separator 62 will be omitted.

The oil contained in the blow-by gas discharged from the internal combustion engine 10 is basically removed bypassing through the oil separator 62. However, there may be a case where the oil cannot be completely removed by the oil separator 62. In this case, a small amount of oil is contained in the blow-by gas that has passed through the oil separator 62.

Next, the "predetermined portion" as a connection destination of the downstream end portion of the blow-by gas flow path 61 will be described. In the present embodiment, a portion configured to allow at least a part of the blow-by gas flowing into the intake passage 20 after passing through the blow-by gas flow path 61 to flow into the air introduction passage 56 together with the intake air passing through the intake passage 20 is used as the predetermined portion. As a specific example of the predetermined portion, in the present embodiment, a portion in the intake passage 20 at the same position in an intake air flowing direction as the portion in the intake passage 20 to which the air introduction passage 56 is connected is used.

That is, in the blow-by gas flow path 61 according to the present embodiment, the blow-by gas (Gb) having passed through the oil separator 62 is introduced to a portion in the intake passage 20 at the same position in the intake air flowing direction as the portion in the intake passage 20 to which the air introduction passage 56 is connected. In other words, in the present embodiment, the portion where the downstream end portion of the blow-by gas flow path 61 is connected to the intake passage 20 and the portion where an upstream end portion of the air introduction passage 56 is connected to the intake passage 20 are located on the same circumference of the intake passage 20. Accordingly, the portion where the downstream end portion of the blow-by gas flow path 61 is connected to the intake passage 20 and the portion where the upstream end portion of the air introduction passage 56 is connected to the intake passage 20 are at the same position when viewed in the intake air flowing direction in the intake passage 20.

With this configuration, a part of the blow-by gas flowing into the intake passage 20 through the blow-by gas flow path 61 after passing through the oil separator 62 is sucked by the air compressor 51 to flow into the air introduction passage 56 together with the intake air of the intake passage 20, and then is introduced into the air compressor 51. The air (air containing the blow-by gas) introduced into the air compressor 51 is compressed in the air compressor 51, and then flows into the air dryer 54. In the air dryer 54, oil and moisture contained in the air are removed, and air from which the oil and moisture are removed is stored in the air tank 55. Further, the air stored in the air tank 55 is then used in the brake system, the air suspension, and the horn.

Operation effects of the present embodiment described above will be summarized as follows. First, according to the present embodiment, a part of the blow-by gas flowing into the intake passage 20 through the blow-by gas flow path 61 after passing through the oil separator 62 can be introduced into the air compressor 51 ("air suction mechanism") together with the intake air. Accordingly, a flow rate of the blow-by gas introduced into the compressor 41 included in the supercharger 40 can be reduced as compared with a case where the total amount of the blow-by gas having passed through the oil separator 62 is introduced into the compressor 41. As a result, occurrence that a large amount of the oil coking substances is generated in the compressor 41 can be prevented. Accordingly, it is possible to prevent a decrease in the supercharging efficiency of the supercharger 40 caused by the oil coking substance.

Further, according to the present embodiment, since the air dryer 54 is disposed at a portion in the discharge air passage 57 between the discharge port 53 of the air compressor 51 and the air tank 55, the oil and moisture contained in the air discharged from the air compressor 51 can be removed by the air dryer 54, and as a result, the air from which the oil and moisture are removed can be stored in the air tank 55. Accordingly, it is possible to prevent accumulation of oil and moisture in the air tank 55.

Second Embodiment

Figure 2:
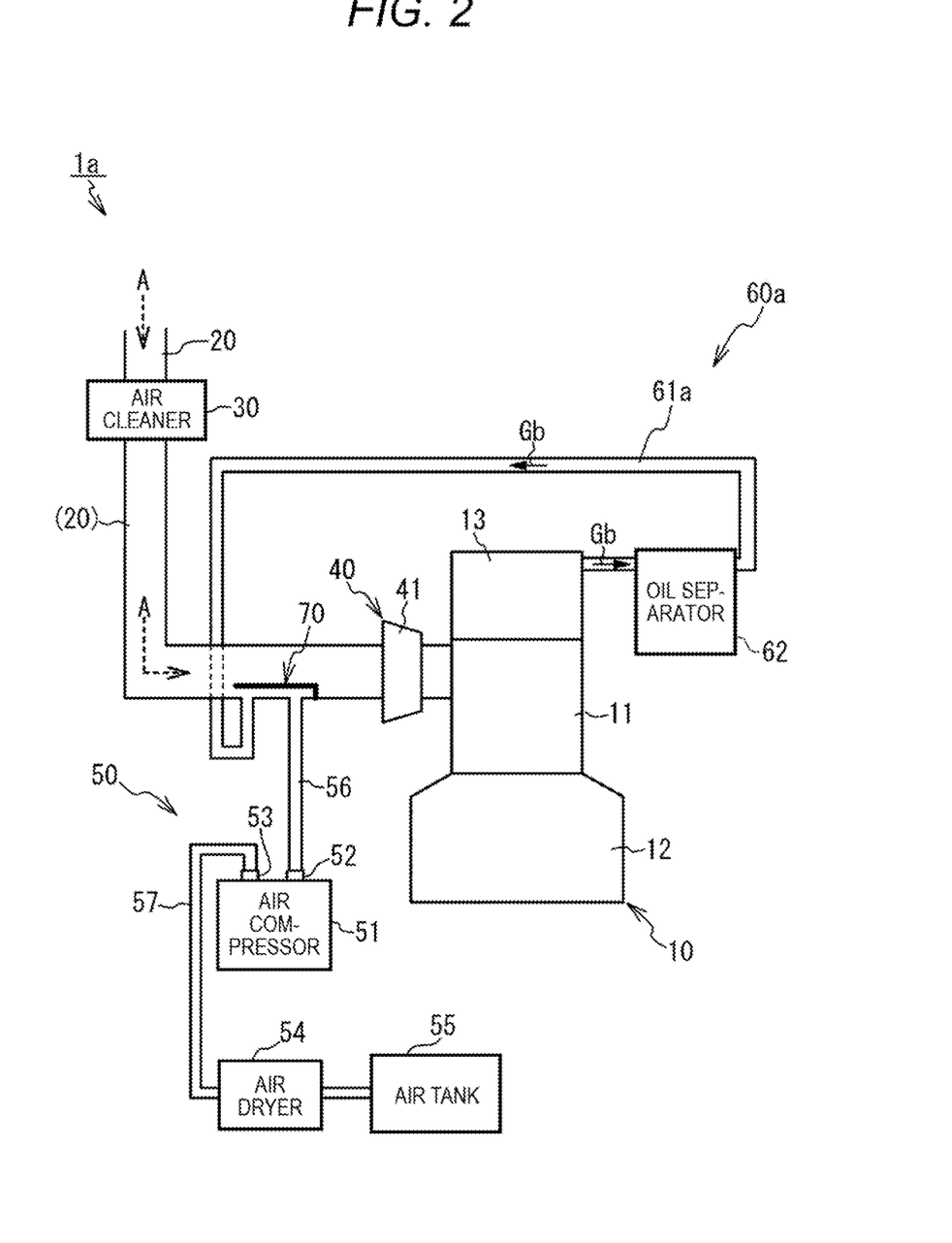
FIG. 2 is a schematic configuration diagram of a vehicle to which a blow-by gas system according to a second embodiment is applied.

Next, a blow-by gas system 60a according to a second embodiment will be described. FIG. 2 is a schematic configuration diagram of a vehicle 1a to which the blow-by gas system 60a according to the present embodiment is applied. The blow-by gas system 60a according to the present embodiment is different from the blow-by gas system 60 (FIG. 1) according to the first embodiment in that the blow-by gas system 60a includes a blow-by gas flow path 61a instead of the blow-by gas flow path 61 and further includes a guide member 70. Since other configurations of the blow-by gas system 60a are the same as those of the blow-by gas system 60, description of the other configurations will be omitted.

A "predetermined portion" as a connection destination of a downstream end portion of the blow-by gas flow path 61a according to the present embodiment is different from that of the blow-by gas flow path 61 according to the first embodiment. Specifically, the predetermined portion according to the present embodiment is a portion in the intake passage 20 upstream with respect to the portion in the intake passage 20, to which the air introduction passage 56 is connected, in the intake air flowing direction.

More specifically, the downstream end portion of the blow-by gas flow path 61a according to the present embodiment is connected to a portion that is in the intake passage 20 upstream with respect to the portion in the intake passage 20, to which the air introduction passage 56 is connected, in the intake air flowing direction, and that is in the intake passage 20 downstream with respect to the portion, at which the air cleaner 30 is disposed, in the intake air flowing direction.

Figure 3:
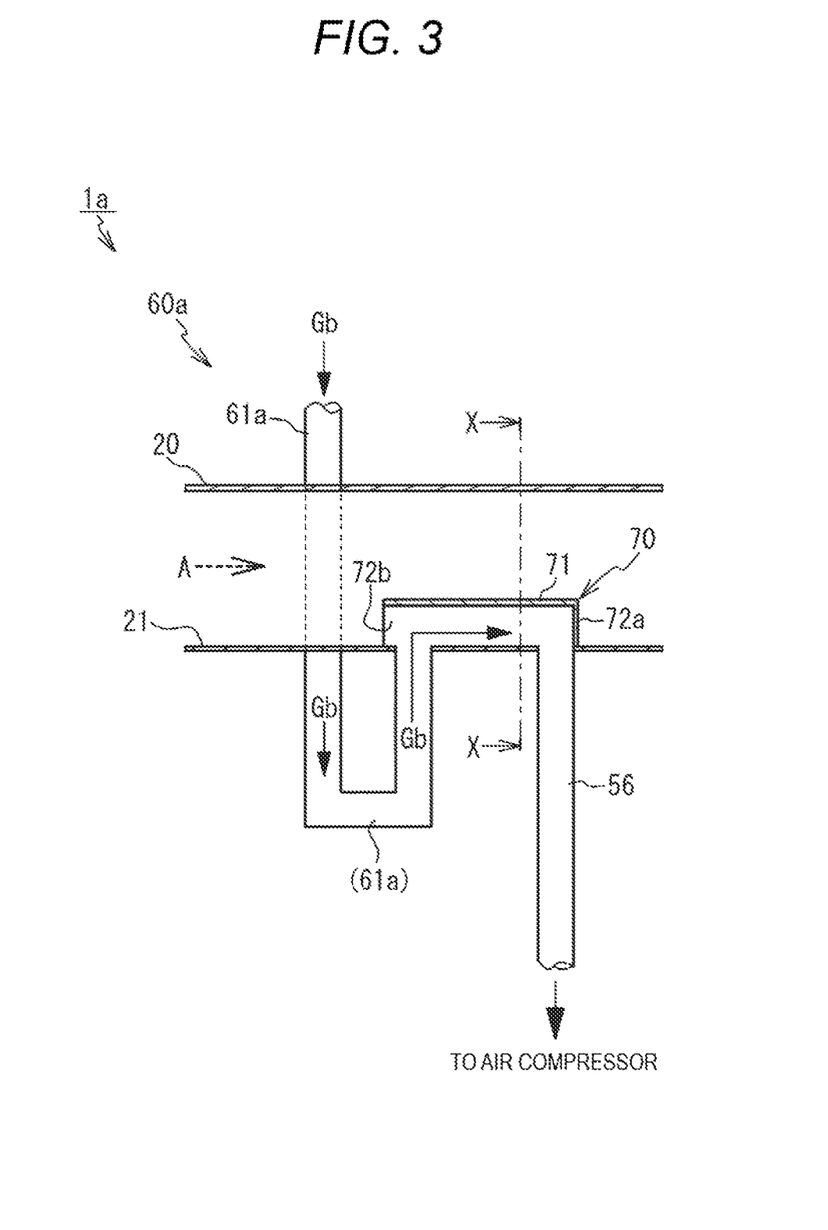
FIG. 3 is a schematic enlarged cross-sectional view of a peripheral structure of a guide member according to the second embodiment.
Figure 4:
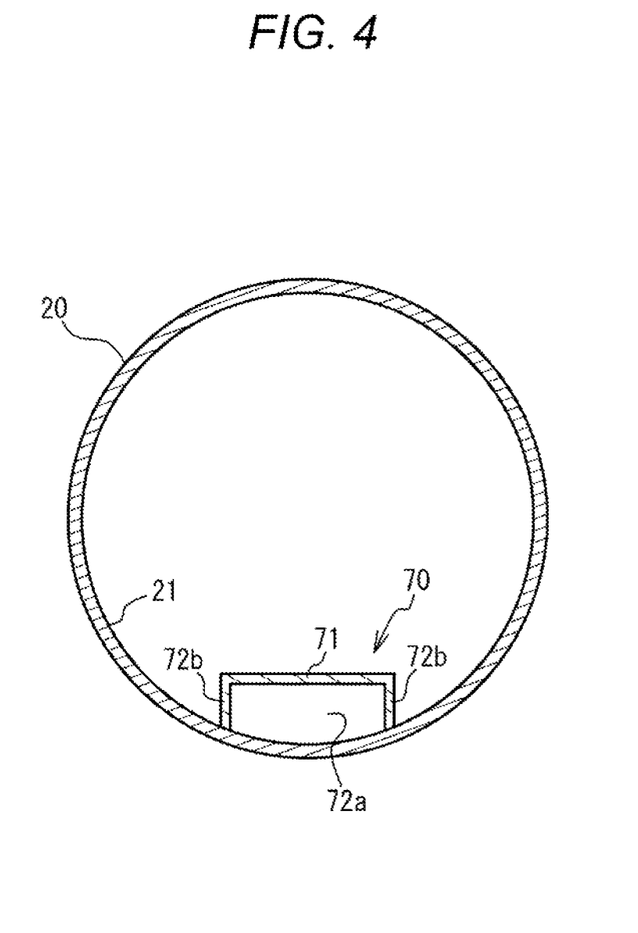
FIG. 4 is a schematic cross-sectional view taken along a line X-X of FIG. 3.

FIG. 3 is a schematic enlarged cross-sectional view schematically illustrating an enlarged cross section of a peripheral structure of the guide member 70. FIG. 4 is a schematic cross-sectional view schematically illustrating a cross section taken along a line X-X of FIG. 3. Specifically, FIG. 4 is a schematic cross-sectional view of a portion (portion of the X-X line) where the guide member 70 of the intake passage 20 is disposed, along a plane taking a central axis of the intake passage 20 as a normal line.

As illustrated in FIGS. 3 and 4, the guide member 70 is disposed inside the intake passage 20. The guide member 70 functions as a guide member that guides the blow-by gas, which flows into the intake passage 20 through the blow-by gas flow path 61, to the air introduction passage 56. A specific configuration of the guide member 70 is not particularly limited as long as the guide member 70 has such a function, and as an example, the guide member 70 according to the present embodiment has the following configuration.

Specifically, the guide member 70 includes a facing wall portion 71 that extends so as to face an inner peripheral surface 21 of the intake passage 20, a leg wall portion 72a that connects a downstream end portion of the facing wall portion 71 to the inner peripheral surface 21 of the intake passage 20, and a leg wall portion 72b that connects both end portions of the facing wall portion 71 in a left and right direction (both end portions in the left and right direction in the cross-sectional view of FIG. 4) to the inner peripheral surface 21 of the intake passage 20. Although the facing wall portion 71 and the leg wall portion 72b according to the present embodiment have an inverted concave cross-sectional shape as illustrated in FIG. 4, the cross-sectional shape is not limited thereto.

Inside the intake passage 20, upstream end portions of the facing wall portion 71 and the leg wall portion 72b in the intake air flowing direction extend to the same position as the portion (predetermined portion) where the downstream end portion of the blow-by gas flow path 61 is connected to the intake passage 20, or extend to a position upstream with respect to the portion (predetermined portion) where the downstream end portion of the blow-by gas flow path 61 is connected to the intake passage 20. Further, inside the intake passage 20, downstream end portions of the facing wall portion 71 and the leg wall portion 72b in the intake air flowing direction extend to the same position as a portion where an upstream end portion of the air introduction passage 56 is connected to the intake passage 20, or extend to a position downstream with respect to the portion where the upstream end portion of the air introduction passage 56 is connected to the intake passage 20.

According to the blow-by gas system 60a according to the present embodiment as described above, since the guide member 70 is provided, the blow-by gas flowing into the intake passage 20 through the blow-by gas flow path 61 after passing through the oil separator 62 can be introduced into the air introduction passage 56 by being guided to pass through a space (which functions as a guide passage) that is defined by the facing wall portion 71, the leg wall portion 72a and the leg wall portion 72b of the guide member 70, and the inner peripheral surface 21 of the intake passage 20. That is, according to the present embodiment, the blow-by gas flowing into the intake passage 20 can be effectively introduced into the air introduction passage 56 by the guide member 70, and then introduced into the air compressor 51. Accordingly, since a flow rate of the blow-by gas introduced into the compressor 41 included in the supercharger 40 can be effectively reduced, it is possible to effectively prevent occurrence that a large amount of oil coking substances are generated in the compressor 41 included in the supercharger 40. As a result, it is possible to effectively prevent a decrease in the supercharging efficiency of the supercharger 40 caused by the oil coking substance.

Modification of Second Embodiment

Although the blow-by gas system 60a includes the guide member 70 in the second embodiment, the blow-by gas system 60a is not limited to this configuration. The blow-by gas system 60a may be configured not to include the guide member 70. Also in this case, as in the case of the first embodiment, at least a part of the blow-by gas flowing into the intake passage 20 flows into the air introduction passage 56 together with the intake air of the intake passage 20, and is introduced into the air compressor 51. Accordingly, as in the case of the first embodiment, occurrence that a large amount of oil coking substances are generated in the compressor 41 included in the supercharger 40 can be prevented, and thus a decrease in supercharging efficiency of the supercharger 40 caused by the oil coking substance can be prevented.

Third Embodiment

Figure 5:
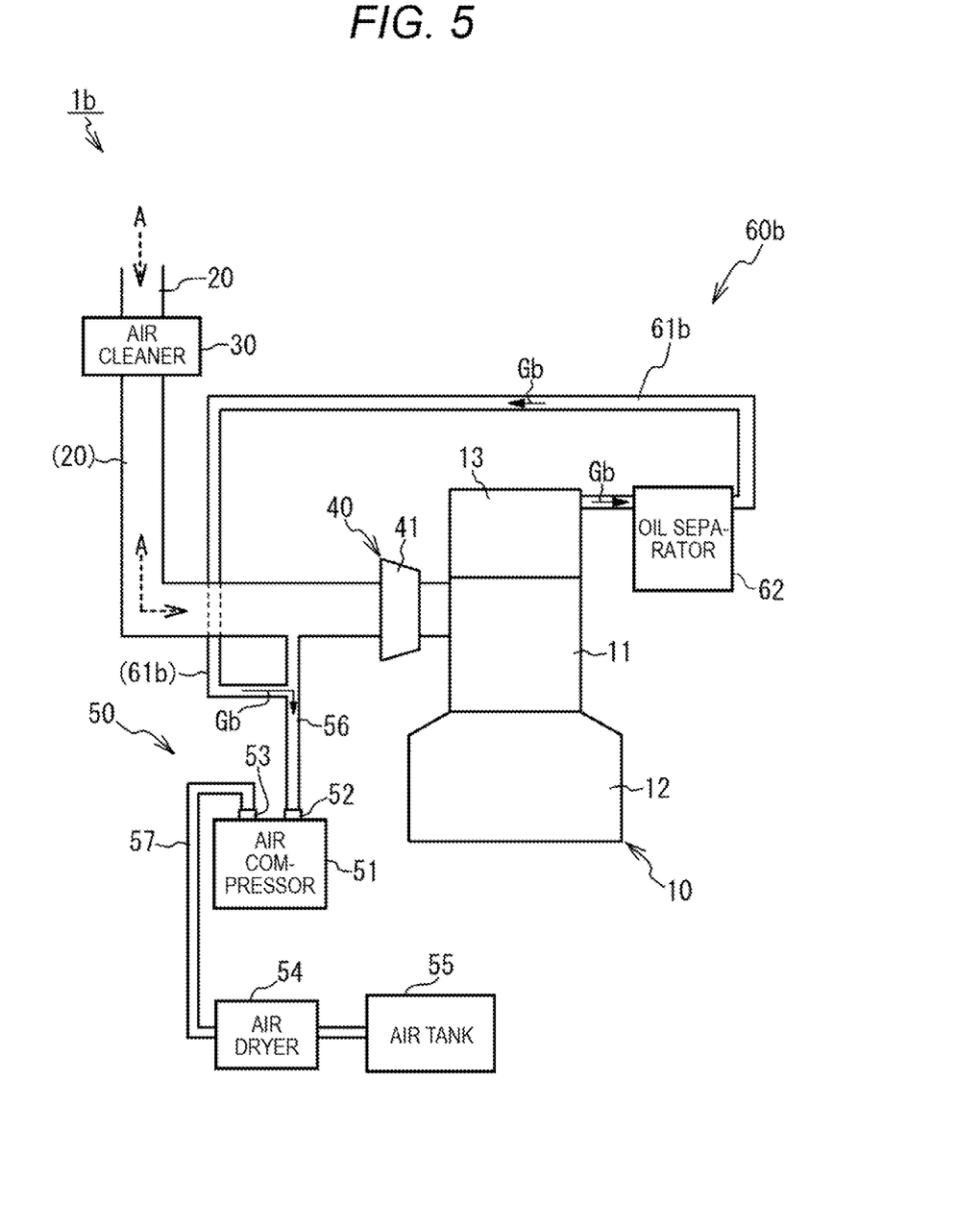
FIG. 5 is a schematic configuration diagram of a vehicle to which a blow-by gas system according to a third embodiment is applied.

Next, a blow-by gas system 60b according to a third embodiment will be described. FIG. 5 is a schematic configuration diagram of a vehicle 1b to which the blow-by gas system 60b according to the present embodiment is applied. The blow-by gas system 60b according to the present embodiment is different from the blow-by gas system 60 (FIG. 1) according to the first embodiment in that the blow-by gas system 60b includes a blow-by gas flow path 61b instead of the blow-by gas flow path 61. Since other configurations of the blow-by gas system 60b are the same as those of the blow-by gas system 60, description of the other configurations will be omitted.

A connection destination of a downstream end portion of the blow-by gas flow path 61b according to the present embodiment is different from that of the blow-by gas flow path 61 according to the first embodiment. Specifically, the downstream end portion of the blow-by gas flow path 61b according to the present embodiment is connected to a midway portion of the air introduction passage 56. That is, the blow-by gas having passed through the oil separator 62 is introduced to the midway portion of the air introduction passage 56 through the blow-by gas flow path 61b. In this case, the blow-by gas having passed through the blow-by gas flow path 61b and the intake air flowing into the air introduction passage 56 from the intake passage 20 are introduced into the air compressor 51.

According to the present embodiment described above, the blow-by gas having passed through the oil separator 62 is introduced to the midway portion of the air introduction passage 56, and thus the blow-by gas having passed through the oil separator 62 is not introduced into the compressor 41 included in the supercharger 40. Accordingly, it is possible to reliably prevent generation of an oil coking substance in the compressor 41 and thus it is possible to reliably prevent a decrease in supercharging efficiency of the supercharger 40 caused by the oil coking substance.

Although the embodiments of the present invention have been described above, the present invention is not limited to such specific embodiments, and various modifications and changes can be made within the scope of the gist of the present invention described in the claims.

This application is based on Japanese Patent Application No. 2018-107087 filed on Jun. 4, 2018, the contents of which are incorporated herein by reference.

INDUSTRIAL APPLICABILITY

According to the blow-by gas system of the present disclosure, it is possible to prevent a decrease in supercharging efficiency of a supercharger caused by an oil coking substance.

REFERENCE SIGNS LIST 1, 1a, 1b vehicle
10 internal combustion engine
20 intake passage
30 air cleaner
40 supercharger
41 compressor
50 air compression system
51 air compressor (air suction mechanism)
52 introduction port
53 discharge port
54 air dryer
55 air tank
56 air introduction passage
57 discharge air passage
60, 60a, 60b blow-by gas system 61, 61a, 61b blow-by gas flow path
62 oil separator
70 guide member

The invention claimed is:

1. A blow-by gas system applied to a vehicle, the vehicle including: an internal combustion engine; an intake passage through which intake air to be sucked into the internal combustion engine passes; and a compressor included in a supercharger disposed in the intake passage, the vehicle including: an air suction mechanism configured to suck air from an introduction port thereof and to discharge the sucked air from a discharge port thereof; and an air introduction passage communicating between a portion in the intake passage upstream with respect to the compressor and the introduction port of the air suction mechanism, the blow-by gas system comprising:

a blow-by gas flow path through which blow-by gas discharged from the internal combustion engine passes; and an oil separator disposed at a midway portion in the blow-by gas flow path, wherein a downstream end portion of the blow-by gas flow path in a blow-by gas flowing direction is connected to at least one of a predetermined portion in the intake passage and a midway portion in the air introduction passage, and wherein the predetermined portion is a portion configured to allow at least a part of the blow-by gas flowing into the intake passage after passing through the blow-by gas flow path to flow into the air introduction passage together with the intake air passing through the intake passage.

2. The blow-by gas system according to claim 1, wherein the predetermined portion is a portion in the intake passage upstream with respect to a portion in the intake passage, to which the air introduction passage is connected, in an intake air flowing direction, and wherein a guide member is disposed inside the intake passage, and is configured to guide the blow-by gas flowing into the intake passage after passing through the blow-by gas flow path to the air introduction passage.

3. The blow-by gas system according to claim 1, wherein the discharge port of the air suction mechanism is connected to an air tank via a discharge air passage, and wherein an air dryer is disposed in the discharge air passage between the discharge port and the air tank.

4. The blow-by gas system according to claim 2, wherein the discharge port of the air suction mechanism is connected to an air tank via a discharge air passage, and wherein an air dryer is disposed in the discharge air passage between the discharge port and the air tank.

* * * * *